(12) United States Patent
Pradeep et al.

(10) Patent No.: US 8,355,382 B2
(45) Date of Patent: Jan. 15, 2013

(54) METHOD AND APPARATUS FOR PROVIDING WIMAX (WORLDWIDE INTEROPERABILITY FOR MICROWAVE ACCESS) ANCHOR MODE SERVICE ON A SYSTEM WITH DISTRIBUTED FORWARDING PLANES

(75) Inventors: Venkatesan Pradeep, Cupertino, CA (US); Neelesh Bansod, Sunnyvale, CA (US); Vamsidhar Valluri, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 509 days.

(21) Appl. No.: 12/616,656

(22) Filed: Nov. 11, 2009

(65) Prior Publication Data

US 2011/0110328 A1 May 12, 2011

(51) Int. Cl.
*H04W 4/00* (2009.01)
*H04W 36/00* (2009.01)

(52) U.S. Cl. ........................ 370/331; 455/436
(58) Field of Classification Search ................. 370/311, 370/331; 455/436–442
See application file for complete search history.

(56) References Cited

FOREIGN PATENT DOCUMENTS

| EP | 1 928 142 A1 | * | 6/2008 |
|---|---|---|---|
| EP | 1928142 A2 | | 6/2008 |
| WO | WO 2009/057930 A2 | * | 5/2009 |
| WO | WO-2009057930 A2 | | 5/2009 |

* cited by examiner

*Primary Examiner* — Habte Mered
(74) *Attorney, Agent, or Firm* — Blakely Sokoloff Taylor & Zafman, LLP

(57) ABSTRACT

Transferring a mobile node from one ASN-GW (anchor access service network gateway) to another ASN-GW is referred to as a hand-over. To facilitate transfer of data for the hand-over, a GRE (generic routing encapsulation) tunnel is established between the two ASN-GWs. Traffic through the GRE tunnel arriving at a line card of an ASN-GW is redirected from the arrival line card to the one line card that contains information for the mobile node. The redirection is based on traversal of one or more tables on the line cards. These tables are indexed according to GRE keys corresponding to the mobile nodes. Therefore, the appropriate line card for the traffic can be identified quickly and efficiently using a distributed forwarding plane with minimal provisioning overhead, resulting in lower latency during the hand-over.

19 Claims, 4 Drawing Sheets

METHOD AND APPARATUS FOR PROVIDING WIMAX (WORLDWIDE INTEROPERABILITY FOR MICROWAVE ACCESS) ANCHOR MODE SERVICE ON A SYSTEM WITH DISTRIBUTED FORWARDING PLANES

BACKGROUND

1. Field

Embodiments of the invention relate to the field of Mobile IP (Internet Protocol); and more specifically, to facilitating a handover of a mobile device in a WiMAX (Worldwide Interoperability for Microwave Access) network.

2. Background

A mobile node operating in a WiMAX network acquires IP connectivity through foreign agent and home agent entities. In particular, the mobile node is coupled to the foreign agent by way of a base station or access point. Another mobile node may also be coupled to the foreign agent by way of the same base station. The foreign agent serves as the local point of attachment for its coupled to mobile nodes. The foreign agent is coupled to a home agent that provides IP connectivity. In other words, a home agent supplies IP connectivity to a mobile node through a foreign agent and base station.

A mobile node may move from its current base station's coverage area to another base station's coverage area. The new base station may be coupled to a different foreign agent. The process of coupling the mobile node to the new base station and the new foreign agent involved is done in a seamless manner to ensure that the mobile node's IP connectivity remains uninterrupted during the transition.

SUMMARY

A WiMAX network includes, among other elements, an anchor ASN-GW (Access Service Network Gateway) and a serving ASN-GW. Network elements or foreign agents act as the anchor ASN-GW and the serving ASN-GW. A mobile node coupled to the anchor ASN-GW can be seamlessly handed over to the serving ASN-GW. Accordingly, the term "anchor" characterizes the foreign agent from which the mobile node is being handed over and the term "serving" characterizes the foreign agent to which the mobile node is being handed over. After the hand-over is complete, the foreign agent that received the mobile node, previously characterized as the serving ASN-GW should then be identified as the new anchor ASN-GW for the mobile node because it is now facilitating the network connectivity to the mobile node post hand-over. The set of procedures that describe the interaction between the anchor and serving ASN-GW is referred to as the WiMAX R4 interface. In the embodiment presented, the session entity on the ASN-GW that represents the mobile node prior to the handover is referred to as the L2 session while the session entity representing the mobile node for the duration of the handover is termed the R4 session.

To begin a hand-over, a data path in a GRE (Generic Routing Encapsulation) tunnel between the anchor ASN-GW and the serving ASN-GW is established. The GRE tunnel supports data transmission between the anchor ASN-GW and the serving ASN-GW to enable the mobile node hand-over.

The anchor ASN-GW includes a control plane and a forwarding/data plane. In connection with the forwarding/data plane, the anchor ASN-GW has a plurality of line card slots. Each line card slot has a line card, but only one of these line cards stores session information for the mobile node at any given time. Maintaining session information for a given mobile node only on one line card helps in maintaining service continuity during the handover and allows the data path to be setup quickly upon initiation of the handover. Each line card also includes a plurality of tables, indexed by GRE key, maintained by one or more modules on the control cards. By traversing one or more of these tables, the line card containing the session information can be identified. GRE keys are allocated to mobile nodes so that data transmission through the GRE tunnel for the hand-over can be managed.

When the anchor ASN-GW receives data of an R4 session through the data path in the GRE tunnel for the hand-over, the data may not arrive at the line card slot that contains the line card with the session information of the mobile node. Since the data may arrive at one of many other line card slots that contain line cards without the session information, the anchor ASN-GW identifies which line card contains the session information by traversing the tables on the line cards using a GRE key of the mobile node subject to the hand-over. The anchor ASN-GW routes the data from the GRE tunnel to the identified line card slot and line card. The tables and GRE key-based traversal thereof allows for the setup of the data path in the GRE tunnel between the anchor ASN-GW and the serving ASN-GW to be completed quickly to minimize data loss due to disruption of the mobile node caused by the hand-over.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
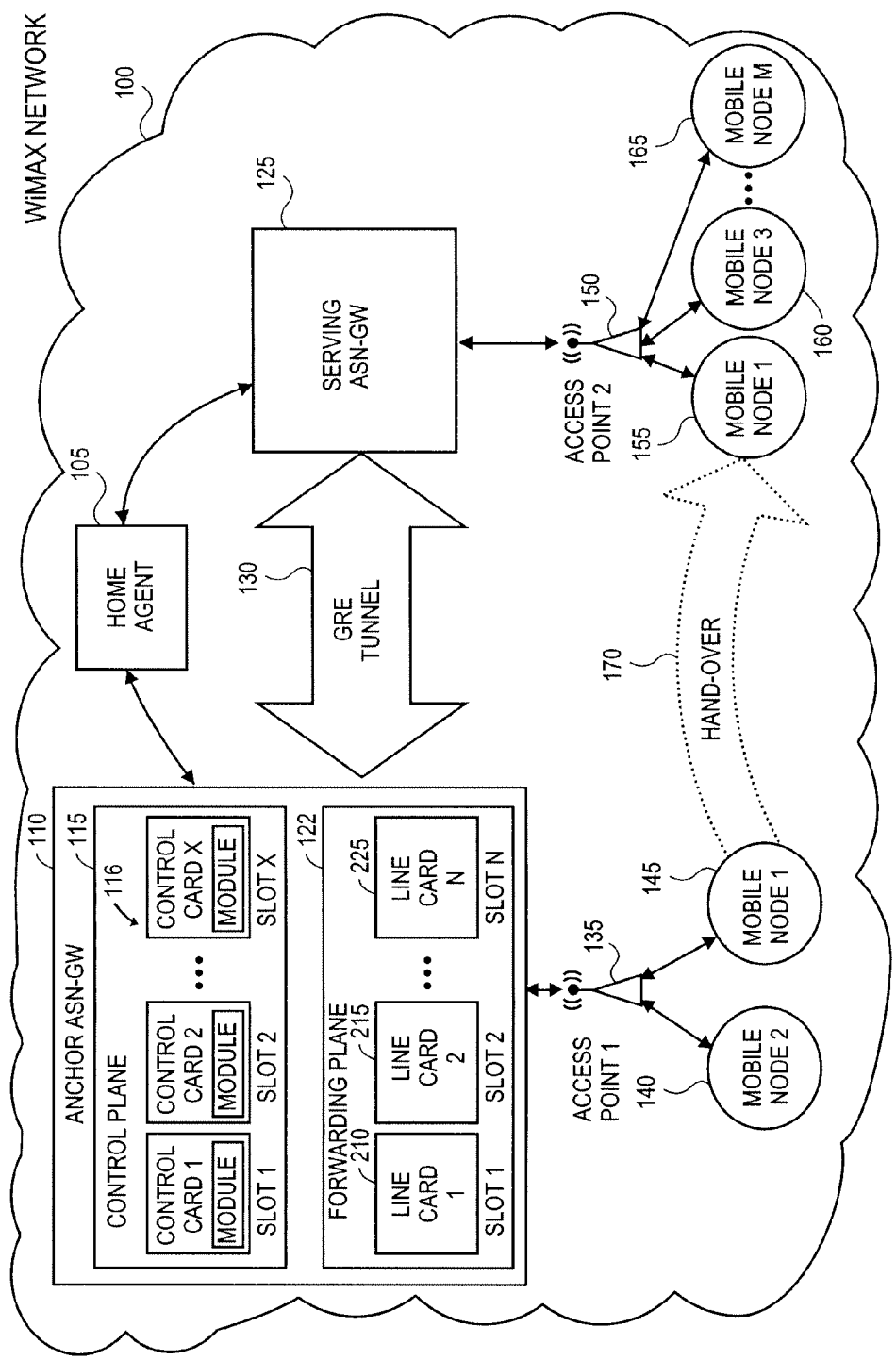
FIG. 1 illustrates an exemplary WiMAX network supporting mobile node hand-over according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer, a network element, etc.). As used herein, a network element (e.g., a router, switch, bridge, etc.) is a piece of networking equipment, including hardware and software that communicatively interconnects other equipment on the network (e.g., other network elements, computer end stations, etc.) Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), etc.), Label Distribution Protocol (LDP), Resource Reservation Protocol (RSVP), etc.) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures, etc.) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms.

FIG. 1 illustrates an exemplary WiMAX network supporting mobile node hand-over according to one embodiment of the invention. In the WiMAX network 100, a home agent 105 provides IP connectivity to the mobile nodes 140, 145, 155, 165 by way of the ASN-GWs 110, 125 and access points 135, 150. In the event of a hand-over 170 of mobile node 1 145 from the anchor ASN-GW 110 to the serving ASN-GW 125, the data communication that occurs to carry through the hand-over occurs in a GRE tunnel 130. GRE tunnel 130 is a key-based GRE tunnel.

In particular, a network element or foreign agent that acts as an anchor ASN-GW 110 includes a control plane 115 and a forwarding plane 122. The control plane 115 includes a plurality of slots 1-X, each of which contains a control card 1-X 116. The forwarding plane 122 also includes a plurality of slots 1-N, each of which contains a line card 210, 215, 225. One or more modules on the control cards 116 are configured to maintain data on the line cards 210, 215, 225, including the tables that are detailed in connection with FIG. 2. The anchor ASN-GW 110 is connected to a base station or access point 1 135, which is in turn connected to mobile node 1 145 and mobile node 2 140. Therefore, mobile node 1 145 and mobile node 2 140 receive network or IP connectivity from the home agent 105 through anchor ASN-GW 110 and access point 1 135.

Likewise, home agent 105 provides network or IP connectivity to a different set of mobile nodes through serving ASN-GW 125. Note that serving ASN-GW 125 is only "serving" for the mobile node 1 145 subject to the hand-over 170, but it is an "anchor" from the perspective of mobile nodes 3 160 through M 165 that are currently coupled to the ASN-GW 125. Serving ASN-GW 125 may be the same type of network element or foreign agent as anchor ASN-GW 110 or it may be of a different type and configuration from anchor ASN-GW 110. For instance, serving ASN-GW 125 may not necessarily contain the tables that are on anchor ASN-GW 110. Serving ASN-GW 125 is connected to a separate base station or access point 2 150, which is connected to mobile node 3 160 and mobile node M 165. After the hand-over 170 of mobile node 1 145 from anchor ASN-GW 110 to serving ASN-GW 125 is complete, anchor ASN-GW 110 no longer supplies IP connectivity to mobile node 1 145. Instead, serving ASN-GW 125 supplies IP connectivity from home agent 105 to mobile node 1 155 (which is mobile node 1 145 post hand-over).

Returning to anchor ASN-GW 110, information for mobile node 1 145 is stored in one of the line cards 210, 215, 225 and information for mobile node 2 140 is stored in one of the line cards 210, 215, 225, which may or may not be the same line card containing information for mobile node 1 145. While the control plane is free to allocate information in line cards by one of many possible algorithms, allocating session information for different mobile nodes on different line cards spreads out the information so that one single line card is not overly burdened with a large amount of data. Prior to hand-over 170, mobile node 1 145 may have been applied various services that, for example, manage traffic coming in and out of mobile node 1 145. These are called L2 (layer-2) sessions. One example of a service on the L2 session is a Legal or Lawful Intercept. This service intercepts a message and sends the message to a different mailbox.

To commence hand-over 170 of mobile node 1 145, a session entity created for the duration of the hand-over through the R4 GRE tunnel 130 is referred to as an R4 session. Also during hand-over 170, one or more modules on the control cards 116 store R4 session information of mobile node 1 145 on just one of the line cards, for instance, on line card 1 in slot 1 210. Thus, for mobile node 1 145, slot 1 is referred to as the home slot because it contains the line card that holds information of the mobile node. A plurality of GRE tunnels may exist between the same anchor ASN-GW and serving ASN-GW (i.e., between two IP addresses). A given GRE tunnel may carry traffic associated with multiple mobile-nodes. Mobile nodes that are undergoing handover are assigned unique GRE keys (dictated by the WiMAX forum standard) so that traffic from multiple mobile nodes traversing the same GRE tunnel can be uniquely identified. The R4 interface specification details, among other things, the means by which GRE keys are assigned to mobile nodes and the means by which the anchor ASN-GW and serving ASN-GW are informed about the assignment. Set up of the data path in the R4 GRE tunnel 130 should occur in as little time as possible to minimize data loss during the hand-over process. For example, the set up should occur within an order of tens of milliseconds, after which the actual hand-over communications through the R4 GRE tunnel 130 will occur.

Data through the GRE tunnel 130 flows two ways to facilitate the set up of mobile node 1 145 in the first position to mobile node 1 155 in the second position. Uplink traffic refers to traffic flowing from serving ASN-GW 125 to anchor ASN-GW 110. More specifically, uplink traffic travels from serving ASN-GW 125, over GRE tunnel 130 to anchor ASN-GW 110, and then on to home agent 105. Downlink traffic refers to traffic flowing in the opposite direction, from anchor ASN-GW 110 to serving ASN-GW 125. In particular, downlink traffic travels from anchor ASN-GW 110, over GRE tunnel 130 to serving ASN-GW 125, through access point 2 150, and then on to mobile node 1 155.

It is noted that uplink traffic arriving at anchor ASN-GW 110 may arrive on one of many line cards 210, 215, 225. Since uplink traffic for the hand-over 170 may not happen to arrive at the home slot (which is the only slot that contains the line card that holds R4 session information of the mobile node), the forwarding plane 122 directs the arriving traffic from the arrival slot to the appropriate slot, i.e., the home slot. The redirection of the traffic occurs without the involvement of the control plane that initializes/maintains the tables, therefore achieving lower latency hand-offs. Further explanation describing how the redirection occurs is discussed in connection with FIG. 2.

In an embodiment of the invention, the R4 session is tied to the L2 session, so that services including Legal Intercept that were in effect on the L2 session prior to the hand-over are continued during the duration of the hand-over. It is noted that the R4 session is the session entity created for the duration of the hand-over and R4 protocol is used for this type of communication, i.e., ASN-GW to ASN-GW type communication over the R4 GRE tunnel.

For downlink traffic, packets are flowing in the opposite direction, i.e., from anchor ASN-GW 110 to serving ASN-GW 125. The L2 session is looked up using the FIB (Forwarding Information Base). The same slot that hosts the L2 session also contains the R4 session information. Since the R4 session is tied to the L2 session, the R4 session can be found without traversing any additional tables. Further, as the R4 session is tied to the L2 session, the L2 session does not need to be re-provisioned with the R4 session to continue services and moreover, the L2 session does not need to be de-provisioned from the R4 session to stop and remove the services. Rather, individual services may be selectively continued or disabled (without explicit removal) for the hand-over as desired, thus avoiding the re-provisioning and de-provisioning overhead that would otherwise be incurred. Not having to re-provision services ensures continuity of any applicable services.

Figure 2:
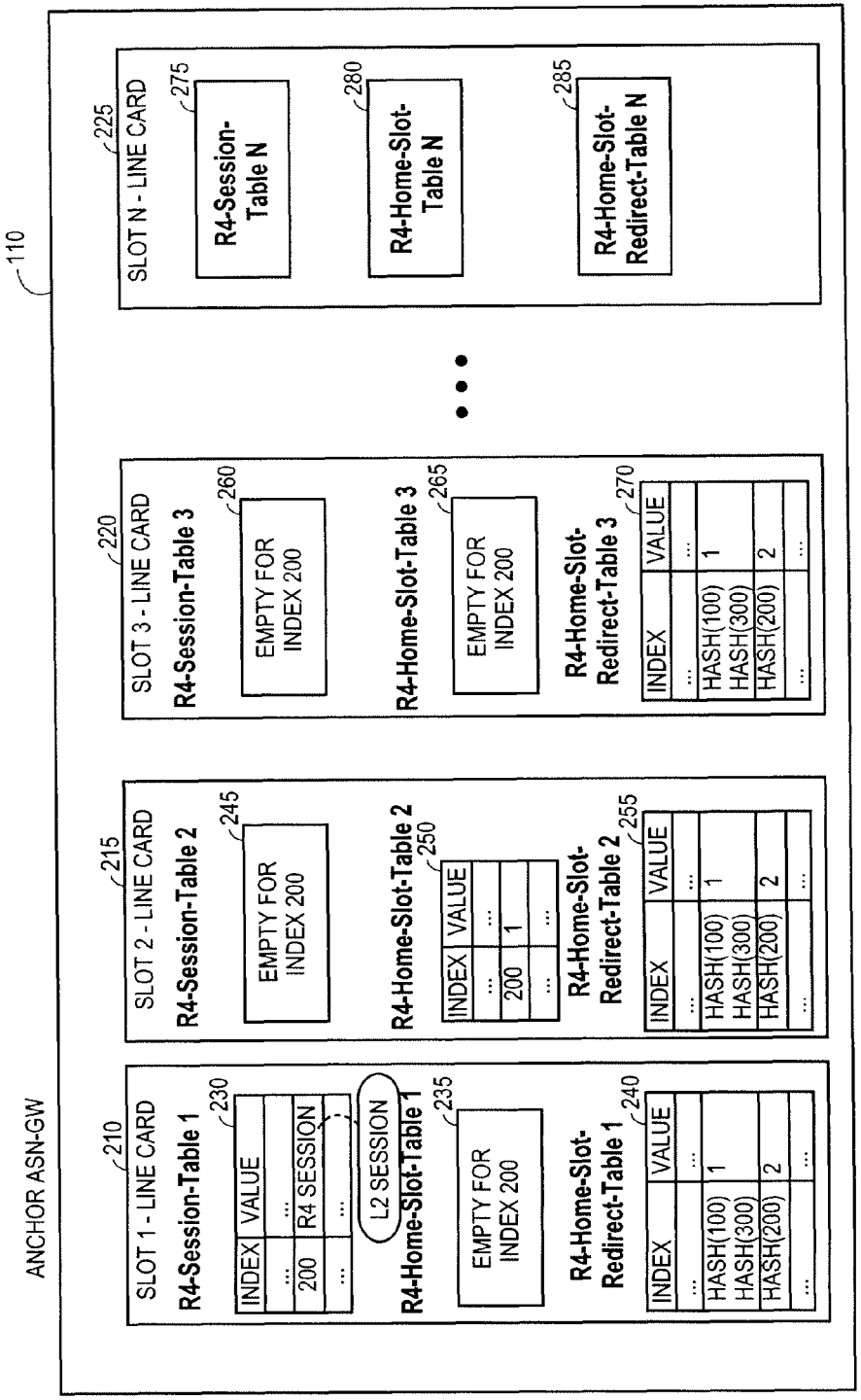
FIG. 2 illustrates exemplary tables on line cards of a foreign agent according to one embodiment of the invention.

FIG. 2 illustrates exemplary tables on line cards of a foreign agent according to one embodiment of the invention. The foreign agent acts as an anchor ASN-GW 110 and has a plurality of line card slots, each of which contains a line card 210, 215, 220, 225. Each of the line cards 210, 215, 220, 225 contains three tables: (1) an R4-Session-Table 230, 245, 260, 275, (2) an R4-Home-Slot-Table 235, 250, 265, 280, and (3) an R4-Home-Slot-Redirect-Table 240, 255, 270, 285. Each table contains two columns, labeled "index" and "value" in the drawing. In this example, the home slot for a mobile node identified by GRE key 200 is slot 1 (line card 210). Uplink traffic arriving at any of the line cards will successfully route to home slot 1 through two or fewer traffic redirections (i.e., by traversal through no more than three line cards).

An R4-Session-Table is indexed by GRE key and R4 session information. The index column identifies GRE keys corresponding to mobile nodes having R4 session information stored on the resident line card. As an example, for a mobile node corresponding to GRE key 200, the control plane has populated its R4 session information onto the line card 210 inserted into slot 1 of anchor ASN-GW 110. R4-Session-Table 1 230 on the line card 210 contains an entry for index 200 identifying that R4 session information resides at that line card. The R4 session is tied to the L2 session. Since R4 session information for any particular mobile node resides on only one line card of the anchor ASN-GW 110 at any given time, the other line cards 210, 220, 225 do not include this R4 session information. Thus, the R4-Session-Tables 245, 260, 275 in the remaining line cards 215, 220, 225 do not contain entries for GRE key 200. The R4-Session-Tables 245, 260, 275 may contain entries for other GRE keys corresponding to other mobile nodes to facilitate their hand-overs.

An R4-Home-Slot-Table is indexed by GRE key and line card slot. The index column of this table identifies GRE keys corresponding to mobile nodes. The value column of this table identifies the line card slot (and corresponding line card) that includes the R4 session information for the mobile node identified by the GRE key. By looking up a GRE key in this table, the data plane redirects the traffic to the line card slot according to the number in the value column. For example, R4-Home-Slot-Table 2 250 of the line card 215 in slot 2 contains an entry for GRE key 200 that identifies line card slot 1 as having the line card containing the R4 session information corresponding to the mobile node identified by GRE key 200. Therefore, traffic that was routed to line card slot 2 will be redirected to line card slot 1 based on R4-Home-Slot-Table 2 250. In this illustration, R4-Home-Slot-Tables 235, 265 in line cards 210, 220 do not contain an entry for GRE key 200. However, other line cards in the anchor ASN-GW 110 not explicitly detailed in the drawing may contain entries for GRE key 200 also identifying line card slot 1 as having the line card with the R4 session information for the mobile node stored thereon.

In another embodiment, information in the R4-Session-Table and the R4-Home-Slot-Table can be combined into one single table on a line card. In this embodiment, each line card will therefore have two tables, rather than three, but each line card will still contain the same information as if it had three tables.

An R4-Home-Slot-Redirect-Table is indexed by hash value (of a GRE key) and line card slot. The index column of this table identifies hash values of GRE keys corresponding to mobile nodes. The value column of this table identifies the line card slot that has a line card with information for the GRE key in its R4-Home-Slot-Table. The R4-Home-Slot-Redirect-Tables 240, 255, 270, 285 are identical on all line cards 210, 215, 220, 225 in the anchor ASN-GW 110. The tables are setup during system initialization and changed only when line cards are inserted or removed. For example, according to the R4-Home-Slot-Redirect-Tables 240, 255, 270, 285, further information for GRE key 200 can be found in line card slot 2 and further information for GRE key 100 and 300 can be found in line card slot 1. When more than one GRE key value hashes to the same hash value, then all the traffic for those GRE keys are directed to the same line card slot. It is noted that redirecting traffic to line card slot 2 for GRE key 200 or line card slot 1 for GRE key 100 and 300 does not mean that the line cards contained in those line card slots include the respective R4 session information. Rather, through a look up in the R4-Home-Slot-Table of the line cards in those slots, one may find further information as to which line card contains the R4 session information. The R4-Home-Slot-Redirect-Table of a line card is traversed only when no information is found in the R4-Home-Slot-Table of the line card.

Figure 3:
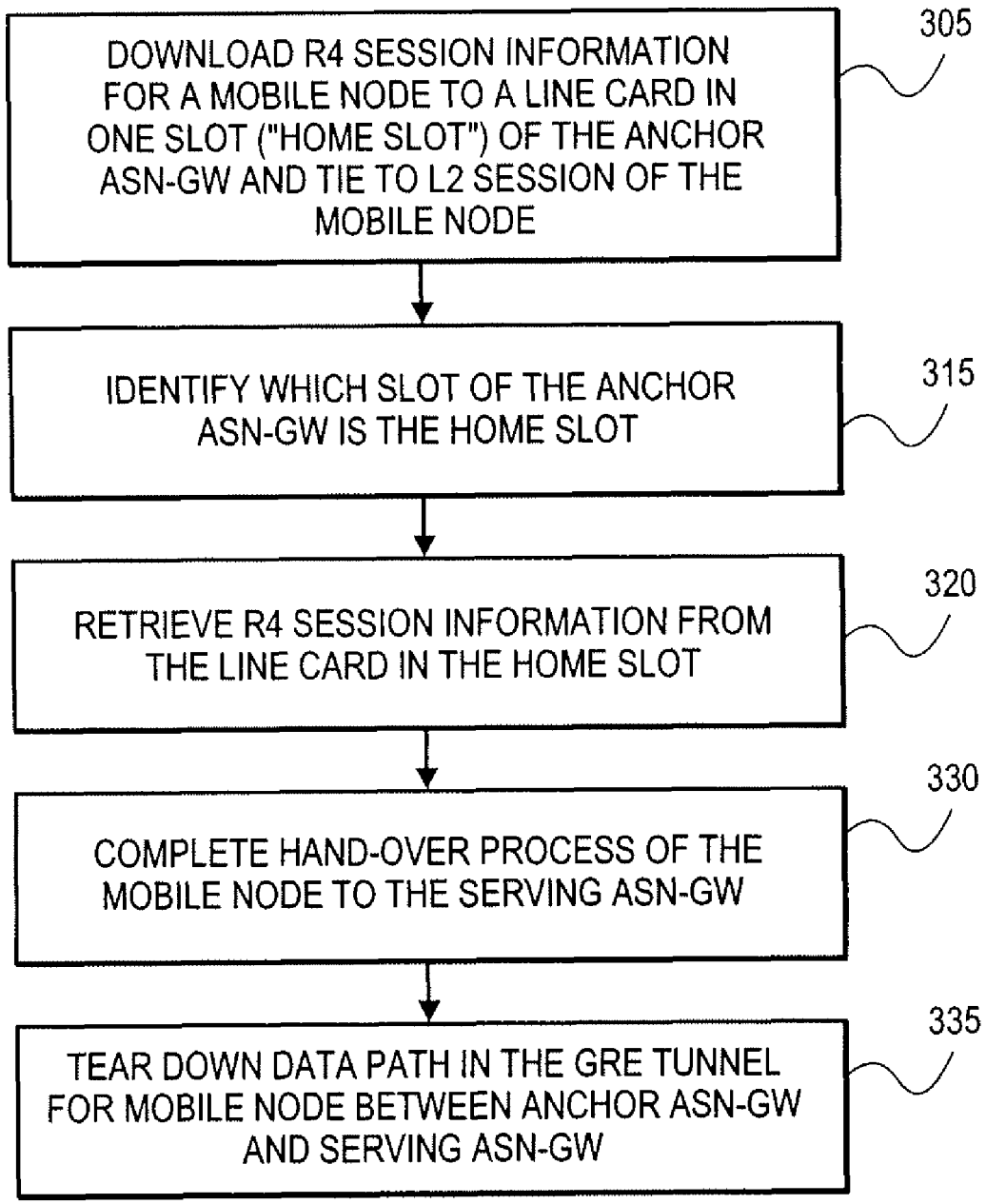
FIG. 3 is a data flow diagram illustrating mobile node handover of an anchor ASN-GW to a serving ASN-GW according to one embodiment of the invention.

FIG. 3 is a data flow diagram illustrating mobile node handover of an anchor ASN-GW to a serving ASN-GW according to one embodiment of the invention. The operations of FIG. 3 will be described with reference to the exemplary embodiment of FIG. 1. However, it should be understood that the operations of flow diagrams can be performed by embodiments of the invention other than those discussed with reference to FIG. 1, and the embodiments discussed with reference to FIG. 1 can perform operations different than those discussed with reference to the flow diagrams.

A mobile node 145 is coupled to anchor ASN-GW 110. At operation 305, one or more modules on control cards 116 download R4 session information for mobile node 145 to one of the line cards 210, 215, 225. This line card is termed the "home slot." The control plane 115 ties the R4 session to the L2 session. Therefore, services such as Legal Intercept on the L2 session can continue to be provided to mobile node 145 during the hand-over. The R4-Session-Table on the L2-session's home-slot will be populated with an entry (indexed by the GRE key) for the R4 session. The R4-Home-Slot-Table on the slot associated with the session's GRE key as specified by the R4-Home-Slot-Redirect-Table will be populated with an entry (indexed by the GRE key) indicating the actual home-slot. The setting up of the table entries essentially primes the data path. Traffic between anchor ASN-GW 110 and serving ASN-GW 125 travels through GRE tunnel 130. Traffic arriving at anchor ASN-GW 110 from serving ASN-GW 125 may not arrive at the home slot. Thus, at operation 315, the forwarding plane identifies which line card slot is the home slot and redirects the incoming traffic from the arrival line card slot to the home slot. At operation 320, the R4 session information is retrieved from the home slot and traffic directed to the home slot is routed through anchor ASN-GW 110 to home agent 105.

At operation 330, data transmissions occur between anchor ASN-GW 110 and serving ASN-GW 125 to complete hand-over 170 of mobile node 1 145 from anchor ASN-GW 110 to its new position as mobile node 1 155 coupled to serving ASN-GW 125. When hand-over 170 is complete, home agent 105 no longer provides IP connectivity to mobile node 1 145 through anchor ASN-GW 110, but rather to mobile node 1 155 through serving ASN-GW 125. Once hand-over 170 is complete, the data path in GRE tunnel 130 is no longer needed to carry traffic for hand-over 170 and therefore is "torn down" or disassociated from the GRE key for the mobile node hand-over 170 (operation 335). The R4 session will be deleted as part of the tear down and removed from the R4-Session-Table.

Figure 4:
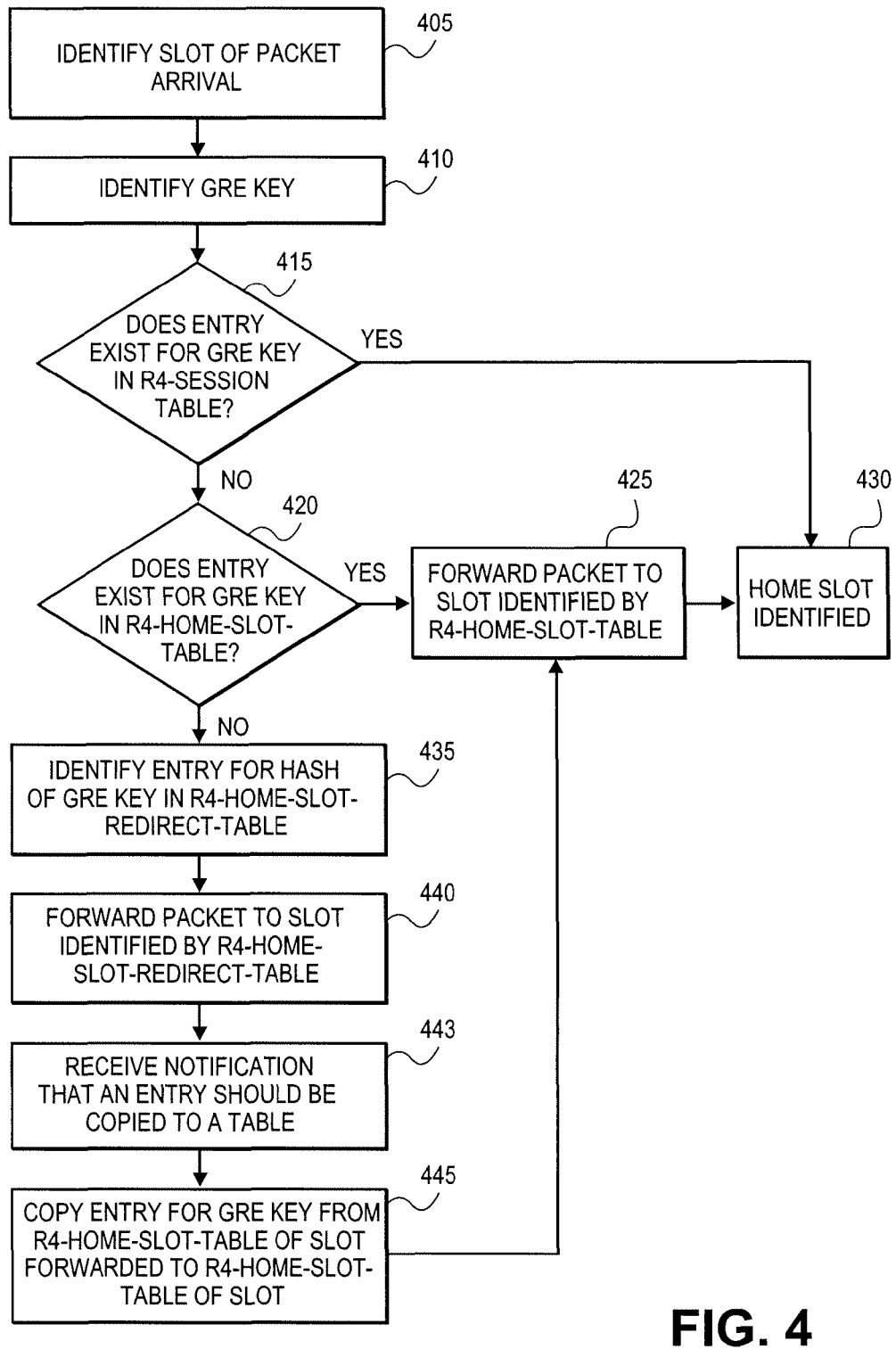
FIG. 4 is a data flow diagram illustrating session information lookup of an anchor ASN-GW according to one embodiment of the invention.

FIG. 4 is a data flow diagram illustrating session information lookup of an anchor ASN-GW according to one embodiment of the invention. The operations of FIG. 4 will be described with reference to the exemplary embodiment of FIGS. 1 and 2. However, it should be understood that the operations of flow diagrams can be performed by embodiments of the invention other than those discussed with reference to FIGS. 1 and 2, and the embodiments discussed with reference to FIGS. 1 and 2 can perform operations different than those discussed with reference to the flow diagrams.

This data flow diagram details operation 315 of FIG. 3 by presenting the perspective of anchor ASN-GW 110 when redirecting incoming traffic from GRE tunnel 130. The home slot identification process is carried out by forwarding plane 122 without the involvement of control plane 115. At operation 405, anchor ASN-GW 110 identifies the line card slot at which traffic (in the form of data packets) for mobile node 1 145's hand-over has arrived. At operation 410, a GRE key for the mobile node hand-over is identified. For illustration purposes, mobile node 1 145 is referenced by GRE key 200.

With reference to FIG. 2, three basic scenarios exist for the arrival of traffic through GRE tunnel 130 to one of the many line card slots on anchor ASN-GW 110. One scenario is where traffic arrives at line card slot 1, where an R4-Session-Table 230 on line card slot 1's line card 210 contains an entry for GRE key 200. Another scenario is where traffic arrives at line card slot 2, where an R4-Session-Table 245 on line card slot 2's line card 215 does not contain an entry for GRE key 200, but an R4-Home-Slot-Table 250 does contain an entry for GRE key 200. A final scenario is where traffic arrives at line card slot 3, where neither the R4-Session-Table 260 nor the R4-Home-Slot-Table 265 on line card slot 3's line card contains an entry for GRE key 200, but R4-Home-Slot-Redirect-Table 270 does contain an entry corresponding to the hash value of GRE key 200. Upon arrival of the data packet to any line card slot, forwarding plane 122 maintains the order in which it traverses the tables. A lookup is performed in R4-Session-Table, then, if necessary, in R4-Home-Slot-Table, and finally, if necessary, in R4-Home-Slot-Redirect- Table. In other words, the table lookup sequence is the same regardless of whether the data packet arrived at the line card slot by redirection or not. Each of these three scenarios is described below.

The first scenario is where traffic arrives at line card slot 1. Forwarding plane 122 first checks whether an entry exists for GRE key 200 in R4-Session-Table 1 230 on the line card 210 in line card slot 1 (operation 415). In this example, an entry does exist for GRE key 200 (Index=200, Value=R4 session information), and therefore, line card slot 1 has been identified as the home slot for mobile node 1 145 (operation 430). The remaining tables on line card 210 in line card slot 1 are not traversed. In summary, in the first scenario, no redirections of traffic are necessary and only one line card is traversed.

The second scenario is where traffic arrives at line card slot 2. Forwarding plane 122 first checks whether an entry exists for GRE key 200 in R4-Session-Table 2 245 on the line card 215 in line card slot 2 (operation 415). Here, an entry does not exist for GRE key 200 ("Empty for Index 200"). Forwarding plane 122 then moves on to the next table, R4-Home-Slot-Table 2 250 and checks whether an entry exists for GRE key 200 in that table 250 (operation 420). Forwarding plane 122 discovers that an entry does exist for GRE key 200 in table 250, which indicates a value of 1. The value of 1 means that line card slot 1 is the home slot for the mobile node identified by GRE key 200. Forwarding plane 122 forwards the data packet from line card slot 2 to line card slot 1. Since R4-Session-Table 1 230 on the line card 210 in line card slot 1 indicates that the R4 session information for mobile node 145 resides on that card, the home slot is identified as line card slot 1 (operation 430). As demonstrated above, in the second scenario, one redirection of traffic occurs and two line cards are traversed.

The third scenario is where traffic arrives at line card slot 3. Forwarding plane 122 first checks whether an entry exists for GRE key 200 in R4-Session-Table 3 260 on the line card 220 in line card slot 3 (operation 415). No entry for GRE key 200 exists. Forwarding plane 122 checks the next table, R4-Home-Slot-Table 3 265, and checks whether an entry exists for GRE key 200 in that table 265 (operation 420). An entry does not exist for GRE key 200 in that table 265 either. Forwarding plane 122 thus identifies the hash value of GRE key 200 and looks up that index in R4-Home-Slot-Redirect-Table 3 270 (operation 435). R4-Home-Slot-Redirect-Table 3 270 indicates that an entry for the hash value of 200 corresponds to a value of 2. This value represents the line card slot that contains a line card with information pertaining to GRE key 200 in its R4-Home-Slot-Table. Accordingly, at operation 440, forwarding plane 122 forwards the data packet from line card slot 3 to line card slot 2. Forwarding plane 122 discovers that an entry for GRE key 200 does not exist in R4-Session-Table 2. However, forwarding plane 122 finds the entry for GRE key 200 in R4-Home-Slot-Table 2 250 on the line card 215 in line card slot 2 and identifies the value corresponding to index 200 as 1. At operation 425, forwarding plane 122 redirects the data packet yet again, but this time from line card slot 2 to line card slot 1 based on R4-Home-Slot-Table 2 250. Since the R4 session information for mobile node 145 resides on the card 210 of line card slot 1, the home slot is identified as line card slot 1 (operation 430).

In one embodiment, turning back to operation 440, upon redirecting the traffic from line card slot 3 to line card slot 2, forwarding plane 122 can dynamically "learn" the home slot location. At operation 443, forwarding plane 122 obtains a notification from the line card in slot 2 to the line card in slot 3 that an entry should be added to R4-Home-Slot-Table 3 265 based on information in R4-Home-Slot-Table 2 250. Forwarding plane 122 can cache an entry to R4-Home-Slot-Table 3 265 on line card 220 in line card slot 3 for GRE key 200. This entry copies the entry obtained from R4-Home-Slot-Table 2 on line card 215 in line card slot 2 for GRE key 200 (operation 445). While FIG. 2 depicts that no entry exists for GRE key 200 in R4-Home-Slot-Table 3 265, after forwarding plane 122 discovers that an R4-Home-Slot-Table of another line card contains such entry, R4-Home-Slot-Table 3 265 will include an entry for GRE key 200 associated with a value of 1. Next time traversal occurs to locate the R4 session information, a need to check R4-Home-Slot-Redirect-Table 3 270 is eliminated resulting in one redirection and two line cards being traversed. As an effect, an initial stream of packets will have a higher latency than later packets due to a reduction in time for traversing to a third table of a line card.

In an embodiment, mechanisms (e.g. versioning) can be maintained for ensuring cache consistency of dynamically learnt entries in the R4-Home-Slot-Table and for dealing with insertion and removal of line cards. Each cache entry will be valid only for a fixed period of time and will be removed automatically after that time without requiring the control plane to remove it when the R4 session goes down. This avoids the overhead of the control plane of informing all slots that might have potentially cached R4 session location information. The control plane can send cache entry removal messages in relatively rare situations such as insertion of line cards, removal of line cards and re-use of a GRE key within the cache validity period.

When a line card becomes non-functional, the control plane will orchestrate the following actions:
  a) For each session homed on the failed line card slot, re-create the L2 and R4 session entities (along with any applicable services) on the least-loaded functional slot. The R4-Session-Table on the chosen slot will have an entry (indexed by the session's GRE key) pointing to the R4 session. Thus, the chosen slot will now be the home-slot for the session. An alternative home slot selection method would be to choose the slot indicated by the R4-Home-Slot-Redirect Table for the session's GRE key if the slot is not the failed slot. Other embodiments exist for choosing the new home slot.
  b) Choose the least-loaded functional slot to host the R4-Home-Slot-Table entries that were hosted on the failed slot. For each session that was re-homed, add an entry (indexed by the session's GRE key) in the R4-Home-Slot-Table on the chosen slot to point to the session's home-slot.
  c) Update entries in the R4-Home-Slot-Redirect-Table on all slots that point to the failed slot to now point to the least-loaded functional slot identified in the previous step.
  d) Invalidate cached entries in the R4-Home-Slot-Table on all slots that point to the failed slot.

The above actions ensure that the data path is restored as quickly as possible for sessions that were on the failed slot and limits the impact only to those sessions.

When a line card becomes functional, the control plane will orchestrate the following actions:
  a) Identify heavily loaded slots and, from the R4-Home-Slot-Redirect table, the GRE keys that map to those slots.
  b) For each of the identified GRE keys, if a session is associated with it, add an entry (indexed by the GRE key) in the R4-Home-Slot-Table on the new slot to point to the session's home-slot.

c) Update the entries associated with the identified GRE keys in the R4-Home-Slot-Redirect-Table on all slots to point to the new slot.

The above actions ensure that the new slot can immediately share in the traffic re-direction load.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network element acting as an anchor ASN-GW (Access Service Network Gateway) for a hand-over of a mobile node within a WiMAX (Worldwide Interoperability for Microwave Access) network, the method comprising the steps of:
    providing network connectivity to the mobile node by the anchor ASN-GW prior to the hand-over, wherein there is a line card in each of a plurality of line card slots in the network element, and only one of these line cards stores R4 session information for the mobile node at any given time, and wherein the R4 session information is information regarding an R4 session entity that represents the mobile node for a duration of the hand-over between the anchor ASN-GW and a serving ASN-GW according to WiMAX;
    identifying a data path in a GRE (Generic Routing Encapsulation) tunnel between the anchor ASN-GW and the serving ASN-GW;
    receiving data of an R4 session from the serving ASN-GW through the data path in the GRE tunnel for the hand-over, wherein R4 protocol is used for ASN-GW to ASN-GW type communication;
    identifying a GRE key to traverse one or more of a plurality of tables, wherein the identified GRE key is used to identify the mobile node for the R4 session in the GRE tunnel for the hand-over;
    accessing, with the GRE key, the one or more of the plurality of tables that are indexed by GRE keys and that are stored on each of the plurality of line cards to obtain the R4 session information for the mobile node;
    locating that line card slot of the plurality of line card slots in the network element that contains the line card with the R4 session information as a result of the step of accessing the one or more of the plurality of tables, whereby setup of the data path in the GRE tunnel between the anchor ASN-GW and the serving ASN-GW is completed efficiently by limiting R4 session information for any given mobile node to be stored in only one of the plurality of lines cards and quickly by locating any given R4 session information through the one or more of the plurality of tables, thus minimizing data loss due to disruption of the mobile node subject to the hand-over; and
    completing the hand-over of the mobile node from the anchor ASN-GW to the serving ASN-GW over the GRE tunnel based on the obtained R4 session information after which IP connectivity to the mobile node is provided by the serving ASN-GW.

2. The method of claim 1, wherein the line card is the only line card in the network element that contains the R4 session information for the mobile node.

3. The method of claim 2, wherein the step of accessing further comprises the steps of:
    identifying a first line card slot in which traffic for the R4 session arrives upon initialization of the data path of the GRE tunnel;
    determining whether the GRE key exists in a first table on a first line card in the first line card, slot;
    identifying the first line card as the only line card that contains the R4 session information upon determination that the GRE key exists in the first table on the first line card;
    determining whether the GRE key exists in a second table on the first line card in the first line card slot upon determination that the GRE key does not exist in the first table on the first line card;
    forwarding the traffic from the first line card slot to a second line card slot identified by the second table on the first line card in the first line card slot and identifying the second line card as the only line card that contains the R4 session information upon determination that the GRE key exists in the second table on the first line card;
    identifying, from a third table on the first line card in the first line card slot, a third line card slot that corresponds to a hash value of the GRE key and forwarding the traffic from the first line card slot to the third line card slot upon determination that the GRE key does not exist in the second table on the first line card;
    forwarding the traffic from the third line card slot to a fourth line card slot identified by the GRE key in a fourth table on a third line card in the third slot upon receiving the traffic at the third line card slot and identifying the GRE key in the fourth table on the third line card;
    determining whether the GRE key exists in a fifth table on a fourth line card in the fourth line card slot upon forwarding of the traffic from the third line card slot to the fourth line card slot; and
    identifying the fourth line card as the only line card that contains the session information upon determination that the GRE key exists in the fifth table of the fourth line card.

4. The method of claim 3, wherein the first table on the first line card and the fifth table on the fourth line card are indexed in a first manner, by GRE key and R4 session information, the second table on the first line card and the fourth table on the third line card are indexed in a second manner, by GRE key and line card slot, and the third table on the first line card is indexed in a third manner, by hash of GRE key and line card slot.

5. The method of claim 4, wherein all line cards of the network element contain the third type of table comprised of identical entries.

6. The method of claim 4, further comprising the step of:
    copying an entry identifying the GRE key from the fourth table on the third line card to the second table on the first line card in response to determining that the GRE key does not exist in the second table on the first line card, whereby next time the session information is being located, a need to traverse the third table on the first line card is eliminated and therefore a need to forward the traffic from the first line card slot to the third line card slot is also eliminated.

7. The method of claim 3, wherein the traffic traverses no more than three line card slots to identify the only line card that contains the session information for any given line card slot in which traffic for the R4 session arrives upon the initialization of any data path in the GRE tunnel.

8. The method of claim 1, further comprising the step of: disassociating the data path of the GRE tunnel from the GRE key after the hand-over is complete.

9. The method of claim 1, further comprising the steps of: establishing an L2 (layer-2) session between the network element and the mobile node; and
tying the R4 session to the L2 session prior to the hand-over.

10. The method of claim 9, further comprising the step of: continuing a Legal Intercept service on the L2 session during the hand-over that began prior to the hand-over.

11. The method of claim 9, further comprising the step of; selectively continuing and disabling services on the L2 session that began prior to the hand-over during the hand-over.

12. A network element to act as a first ASN-GW (Access Service Network Gateway), to provide network connectivity to a mobile node and to facilitate a hand-over of the mobile node from the first ASN-GW to a second network element that acts as a second ASN-GW, the network element comprising:
a plurality of line card slots, each of which to hold a line card to support traffic between a plurality of mobile nodes and the network element, wherein only one line card will be adapted to contain R4 session information for the mobile node at any given time, and wherein each of the plurality of mobile nodes is assigned a GRE (Generic Routing Encapsulation) key for a GRE tunnel, and wherein the R4 session information is information regarding an R4 session entity that represents the mobile node for a duration of the hand-over between the first ASN-GW and the second ASN-GW according to WiMAX; and
one or more control modules on one or more control cards to maintain a plurality of tables on each of the plurality of line cards, the pluralities of tables indexed based on the GRE keys to allow for traversal through the pluralities of tables using the mobile node's GRE key to locate the only one line card that contains the R4 session information for the mobile node and match the only one line card that contains the R4 session information for the mobile node with a data flow from the GRE tunnel between the first ASN-GW and the second ASN-GW for the hand-over of the mobile node, whereby the use of the GRE key speeds the traversal to quickly match the data flow from the GRE tunnel with the only one line card that contains the R4 session information for the mobile node so as to minimize data loss due to disruption of services between the mobile node and the network element caused by the hand-over.

13. The network element of claim 12, wherein after the hand-over of the mobile node is complete, a path in the GRE tunnel that carries the data flow is disassociated from the mobile node's GRE key and the second network element provides the internet connectivity to the mobile node.

14. The network element of claim 12, wherein the plurality of tables in the only one line card comprises:
a first table adapted to identify the mobile node's GRE key that corresponds to the R4 session information contained in the only one line card;
a second table adapted to identify another line card slot assigned to a second mobile node's GRE key that corresponds to a second mobile node's R4 session information contained in the line card in the another line card slot; and
a third table adapted to identify a further line card slot assigned to a hash value that identifies a range of GRE keys, wherein the line card in the further line card slot to contain a fourth table of the with an entry for a third GRE key in the range of GRE keys that corresponds to a third R4 session information.

15. The network element of claim 14, wherein the third table is to contain identical entries for each line card slot of the plurality of line card slots.

16. The network element of claim 14, wherein the second table and the fourth table are to be indexed in a same manner, by GRE key and line card slot.

17. The network element of claim 14, wherein upon discovery that the second table does not include an entry for the third GRE key, the second table grows in size with an addition of the entry for the third GRE key copied from the fourth table, whereby traversal of the third table for subsequent attempts to locate the third R4 session information is eliminated and therefore forwarding the traffic for the third R4 session information based on the third table is also eliminated.

18. A WiMAX (Worldwide Interoperability for Microwave Access) network for supporting a hand-over of a mobile node from an anchor ASN-GW (Access Service Network Gateway) to a serving ASN-GW, the WiMAX network comprising:
a first network element, acting as the anchor ASN-GW, that provides internet connectivity to the mobile node prior to the hand-over, the first network element including:
a plurality of line card slots, each of which to hold a line card to support traffic between a plurality of mobile nodes and the first network element, wherein only one line card will be adapted to contain R4 session information for the mobile node at any given time, and wherein each of the plurality of mobile nodes is assigned a GRE (Generic Routing Encapsulation) key for a GRE tunnel, and wherein the R4 session information is information regarding an R4 session entity that represents the mobile node for a duration of the hand-over between the anchor ASN-GW and the serving ASN-GW according to WiMAX; and
one or more control modules on one or more control cards to maintain a plurality of tables on each of the plurality of line cards, the pluralities of tables indexed based on the GRE keys to allow for traversal through the pluralities of tables using the mobile node's GRE key to locate the only one line card that contains the R4 session information for the mobile node and match the only one line card that contains the R4 session information for the mobile node with a data flow from the GRE tunnel between the first ASN-GW and the second ASN-GW for the hand-over of the mobile node, whereby the use of the GRE key speeds the traversal to quickly match the data flow from the GRE tunnel with the only one line card that contains the R4 session information for the mobile node so as to minimize data loss due to disruption of services between the mobile node and the first network element caused by the hand-over; and
a second network element, acting as the serving ASN-GW, that provides internet connectivity to the mobile node subsequent to the hand-over.

19. The WiMAX network of claim 18, wherein the first network element copies an entry for the GRE key in a table of the plurality of tables on the only one line card to another table of the plurality of tables for another line card when traversal of the another table occurs and the entry for the GRE key is not found.

* * * * *

UNITED STATES PATENT AND TRADEMARK OFFICE
CERTIFICATE OF CORRECTION

PATENT NO.        : 8,355,382 B2
APPLICATION NO.   : 12/616656
DATED             : January 15, 2013
INVENTOR(S)       : Pradeep et al.

It is certified that error appears in the above-identified patent and that said Letters Patent is hereby corrected as shown below:

In the Claims:

In Column 12, Line 10, in Claim 3, delete "card," and insert -- card --, therefor.

In Column 12, Line 53, in Claim 5, delete "type of".

In Column 13, Line 14, in Claim 11, delete "of;" and insert -- of: --, therefor.

Signed and Sealed this
Fourteenth Day of May, 2013

Teresa Stanek Rea
*Acting Director of the United States Patent and Trademark Office*